US008270696B2

(12) United States Patent
Udupa et al.

(10) Patent No.: US 8,270,696 B2
(45) Date of Patent: Sep. 18, 2012

(54) IMAGE SLICE SEGMENTATION USING MIDPOINTS OF CONTOUR ANCHOR POINTS

(75) Inventors: Jayaram K. Udupa, Audubon, PA (US); Andre Souza, Webster, NY (US); George Grevera, Collegeville, PA (US); Dewey Odhner, Horsham, PA (US)

(73) Assignee: The Trustees Of The University Of Pennsylvania, Philadelphia, PA (US)

( * ) Notice: Subject to any disclaimer, the term of this patent is extended or adjusted under 35 U.S.C. 154(b) by 1259 days.

(21) Appl. No.: 12/028,332

(22) Filed: Feb. 8, 2008

(65) Prior Publication Data
US 2008/0193006 A1 Aug. 14, 2008

Related U.S. Application Data

(60) Provisional application No. 60/900,639, filed on Feb. 9, 2007.

(51) Int. Cl.
*G06K 9/00* (2006.01)
*G06K 9/34* (2006.01)

(52) U.S. Cl. ........ 382/131; 382/130; 382/132; 382/173; 382/181

(58) Field of Classification Search .................. 382/128, 382/130–132, 173, 180, 181, 190–196, 199; 345/619–625; 715/700
See application file for complete search history.

(56) References Cited

U.S. PATENT DOCUMENTS

| 6,718,062 B1 * | 4/2004 | Zhang et al. .................. 382/218 |
| 2003/0174872 A1 * | 9/2003 | Chalana et al. ................ 382/128 |
| 2004/0213460 A1 * | 10/2004 | Chen ............................. 382/199 |
| 2005/0228269 A1 * | 10/2005 | Ashton .......................... 600/421 |
| 2005/0276455 A1 * | 12/2005 | Fidrich et al. ................. 382/128 |
| 2006/0241452 A1 * | 10/2006 | Cerofolini ..................... 600/444 |
| 2008/0267468 A1 * | 10/2008 | Geiger et al. .................. 382/128 |

OTHER PUBLICATIONS

Falcao, A.X. et al., "User-steered image segmentation paradigms: Live wire and live lane," Graphical Models and Image Processing, 60, 233-260, 1998.
Hamameh, G. et al., "3D live-wire-based semi-automatic segmentation of medical images," Proceedings of SPIE: Medical Imaging, 5747, 1597-1602, 2005.
Kass, M. et al., "Snakes: Active Contour Models," International Journal of Computer Vision, 1, 321-331, 1987.
Mortensen, E.N. et al., "Interactive Segmentation with Intelligent Scissors," Graphical Models and Image Processing, 60, 349-384, 1998.
Falcao, A.X. et al., "A 3D generalization of user-steered live wire segmentation," Medical Image Analysis, 4, 389-402, 2000.
Raya, S.P. et al., "Shape-based interpolation of multidimensional objects," IEEE Transactions on Medical Imaging, 9, 32-43, 1990.
Schenk, A. et al., "Efficient semiautomatic of 3D objects in medical image," Proceedings of MICCAI, 1935 /2000, 186-195, 2000.
Udupa, J.K. et al., "3DVIEWNIX: An open, transportable, multidimensional, multimodality, multiparametric imaging software system," Proceedings of SPIE: Medical Imaging, 2164, 58-73, 1994.
Udupa, J.K. et al., "A framework for evaluating image segmentation algorithms", Computerized Medical Imaging and Graphics, 30, 75-87, 2006.

* cited by examiner

*Primary Examiner* — Phillip A Johnston
*Assistant Examiner* — Brooke Purinton
(74) *Attorney, Agent, or Firm* — Woodcock Washburn, LLP

(57) ABSTRACT

Methods for the improved interactive segmentation of medical image slice data using a computer include the novel combination of the well-known live wire and snakes methods. The improved techniques automatically insert new anchor points for each medical image slice that is processed. The improved methods called iterative live wire and live snakes result in a segmentation process that is faster, more accurate, and requires less operator interaction than the previous methods while still allowing an operator to make adjustments to the segmentation as the process moves from one image slice to the next.

14 Claims, 7 Drawing Sheets

Example Iterative Live Wire Flow Diagram

Example Live Snakes Flow Diagram

IMAGE SLICE SEGMENTATION USING MIDPOINTS OF CONTOUR ANCHOR POINTS

CROSS-REFERENCE TO RELATED APPLICATION

This application is claims priority to U.S. provisional application No. 60/900,639 filed Feb. 9, 2007 entitled "Iterative Live Wire and Live Snake; New User-Steered 3D Image Segmentation Paradigms", which is incorporated herein by reference in its entirety.

FIELD OF THE INVENTION

The present invention is directed to segmentation of image data. Specifically, the present invention is directed to methods for the segmentation of image data derived from medical imaging systems.

BACKGROUND

Image segmentation is one of the most challenging problems faced by many medical imaging applications despite four decades of advance in the field. Segmentation methods should produce accurate, repeatable, and efficient segmentations of medical images which will lead to more effective visualization, manipulation and analysis of anatomic structures (objects). Segmentation consists of two tightly coupled tasks; recognition and delineation. Recognition is the process of identifying roughly the whereabouts of a particular object of interest and distinguishing it from other objects present in the image. Delineation is the process of specifying the precise spatial extent of the object. The processes of recognition and delineation cover a wide spectrum of segmentation approaches ranging from manual to automatic. Interactive approaches may be divided into three groups: image-based, model-based and hybrid. Image-based approaches utilize mostly information derived entirely from images to segment a given object. In model-based approaches, prior knowledge about the objects is incorporated into the model which drives the segmentation process. Hybrid approaches attempt to utilize the strengths of each of image- and model-based approaches to overcome weaknesses of the other.

The well known live wire approach is a very powerful interactive image-based segmentation method directly steered by the user. The live wire technique individually segments two dimensional medical image slices. Multiple slices make up a medical image data set for an object. Other popular two dimensional segmentation methods include the well known snakes computer program method (also known as active contour models) and Active Shape Models program (ASM). In the snakes computer program method, an energy functional based on contour deformation and external image forces is minimized. In the ASM approach, image searching is performed with a flexible and compact statistical shape model which is created by using prior knowledge derived from training data sets. Each of the three methods has strengths and weaknesses. It is desired to realize an approach that can improve the accuracy of a segmentation process while reducing the total amount of human interaction. The present invention addresses these concerns and others.

SUMMARY

An embodiment of the present invention is an interactive segmentation method that exploits the synergy between the user knowledge (for recognition) and the underlying computer processing done automatically (for delineation). Two novel interactive 3D segmentation methods, called iterative live wire (ILW) and live snake (LS), are described that combine the complementary strengths of the well known live wire computer program method and the well known snakes computer program method to arrive at more accurate and efficient strategy than the well known individual methods.

The iterative live wire method for image segmentation uses initial user-supplied anchor points placed on a medical image slice. The initial anchor points are placed to segment an object boundary of interest in the medical image slice. This initial anchor placement uses the live wire technique to draw contour segments between the placed anchor points along the boundary of interest on the image slice. The successfully placed anchor points are then projected to the next slice where new anchor points are automatically placed at midpoints on each live wire contour segment. New contours for the new anchor points are then automatically constructed. This process then continues iteratively. The user may adjust the constructed contours on each slice manually using either live wire or snakes. The process of iterative live wire then continues to the next slice until completion.

The live snakes method for image segmentation uses initial user-supplied contour placed on a medical image slice and uses the snakes technique to establish a boundary of interest on the image slice. Points on this boundary are then used as anchor points to perform live wire on them iteratively. The resulting contour is then projected to the next slice where first the snakes method is applied followed by live wire. New boundaries for the feature on the next image slice are then automatically constructed. The user may adjust the constructed contours on each slice manually using either snakes or live wire. The process of live snakes then continues to the next slice until completion.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Exemplary Embodiments

Figure 1:
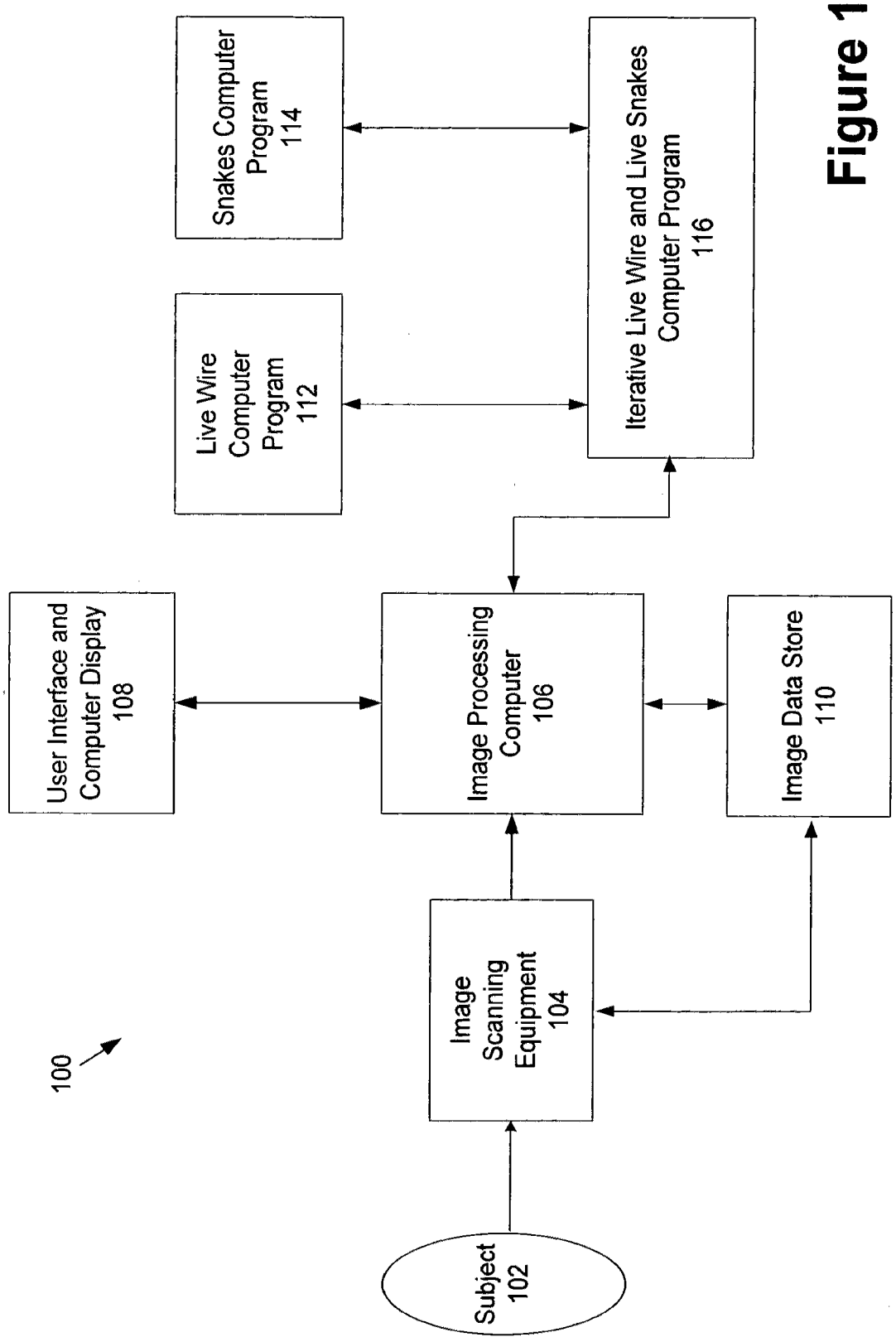
FIG. 1 is a block diagram depicting a system having elements of the present invention.

FIG. 1 depicts one embodiment in which aspects of the present invention may be realized. The image acquisition and processing system 100 of FIG. 1 includes image scanning equipment 104, such as a magnetic resonance imaging (MRI) scanner or computerized tomography (CT) scanner, that images a subject 102 to produce a volume of image data in the form of a plurality of individual image slices. The entire set of image slices makes up the entire volume of the subject. The number of slices may vary from a few dozen to thousands of image slices. The image slices may be stored in the image data store 110 as raw images. These raw images can be referred to as pre-processed image data.

Post-processing of image data can take many forms. In one embodiment, the image processing computer 106, in conjunction with a user interface 108, uses the raw image data stored in 110 to produce more usable forms of image slice data. In the embodiment of FIG. 1, a new computer program 116 termed iterative live wire (ILW) and live snakes (LS) utilizes the existing programs of live wire 112 and snakes 114, along with a new technique, to post-process the raw image data to fully extract information from the image slice data. The post-processed medical image slice data can then be stored in the image data store and retrieved to more easily serve as an analysis tool for the subject of interest.

The new iterative live wire (ILW) and live snakes (LS) methods use the existing live wire and snakes computer programs in a synergistic manner. A discussion of each is an instructive introduction to the new techniques.

An acquired digital volume image is referred to as a scene and it may be represented by a pair C=(C, f) where C={c|−bj≦cj≦bj for some b $\in Z^3$}, $Z^3$ is the set of 3-tuples of positive integers called voxels, f is a function whose domain is C, called the scene domain, and whose range is a set of integers [L, H], and for any c $\in$ C, f (c) is referred to as the intensity of c. C is a binary scene if the range of f is {0,1}. For any set X, the notation |X| is used to denote its cardinality.

Figure 2:
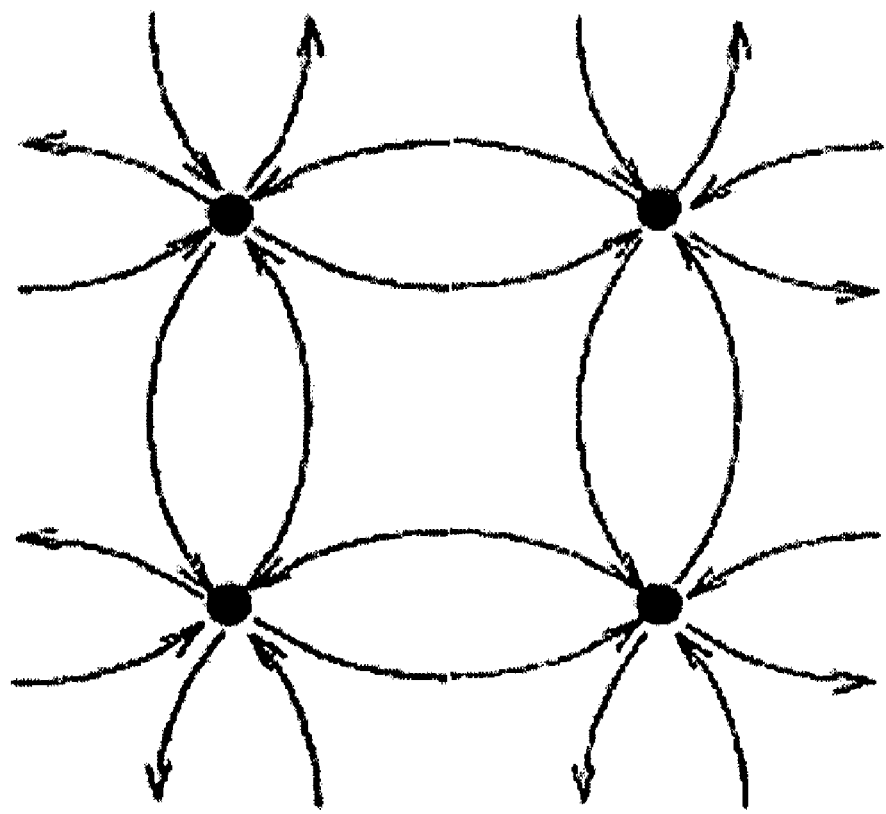
FIG. 2 is a graph model used in finding optimum boundaries for the live wire method.

The well-known live wire (LW) method, as described by A. X. Falcao, J. K. Udupa, S. Samarasekera, B. E. Hirsch, and S. Sharma, in "User-steered image segmentation paradigms: live wire and live lane," Graphical Models and Image Processing, 60, pp. 233-260, 1998., incorporated herein in its entirely, embeds within a slice of C a weighted and directed graph with the vertices of the pixels representing the nodes of the graph and the oriented pixel edges representing the arcs as in FIG. 2. A graph model is used in finding optimum boundaries. In FIG. 2, the nodes in this graph are the pixel vertices and the two directed arcs between every pair of nodes represent two possible oriented pixel edges. Only four nodes are shown in FIG. 2.

Figure 3:
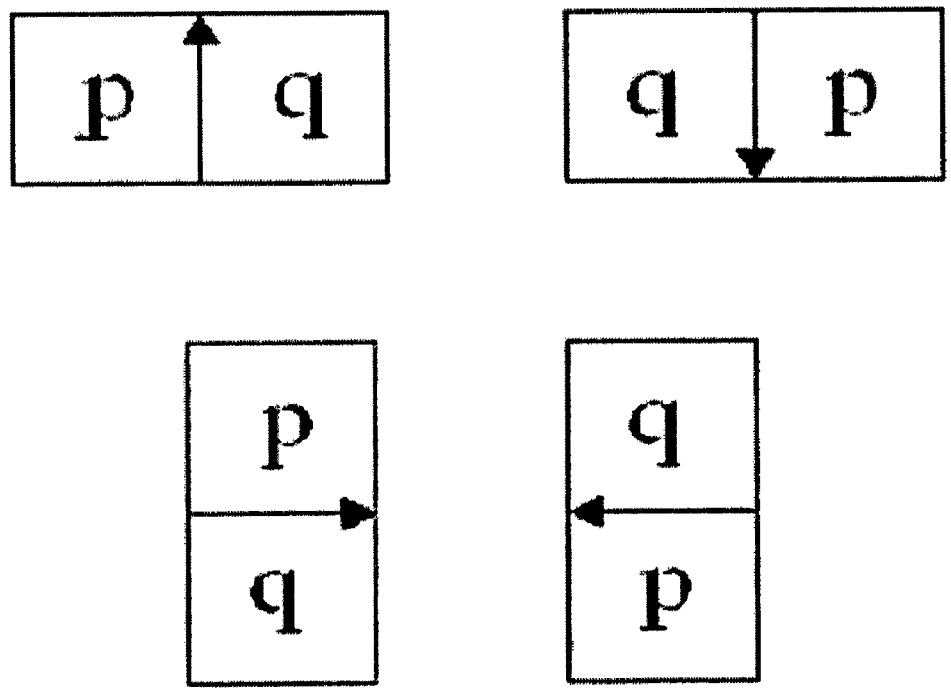
FIG. 3 is a boundary element oriented pixel edge as used in the live wire method.

A boundary element (bel) b=(p, q) is represented by a particular oriented pixel edge as shown in FIG. 3. In FIG. 3, a boundary element (bel) is an oriented pixel edge. The four possible bels in a slice of C are shown. The "inside" of the boundary is to the left of the bel and the "outside" is to the right of the bel. Each bel b has a set of feature values which characterize the "boundariness" of b. These values are converted to a single joint cost value per bel b. The entire 2D boundary (a connected, oriented, closed contour) is thought of as a sequence of bels whose total cost is the smallest possible.

Figure 4:
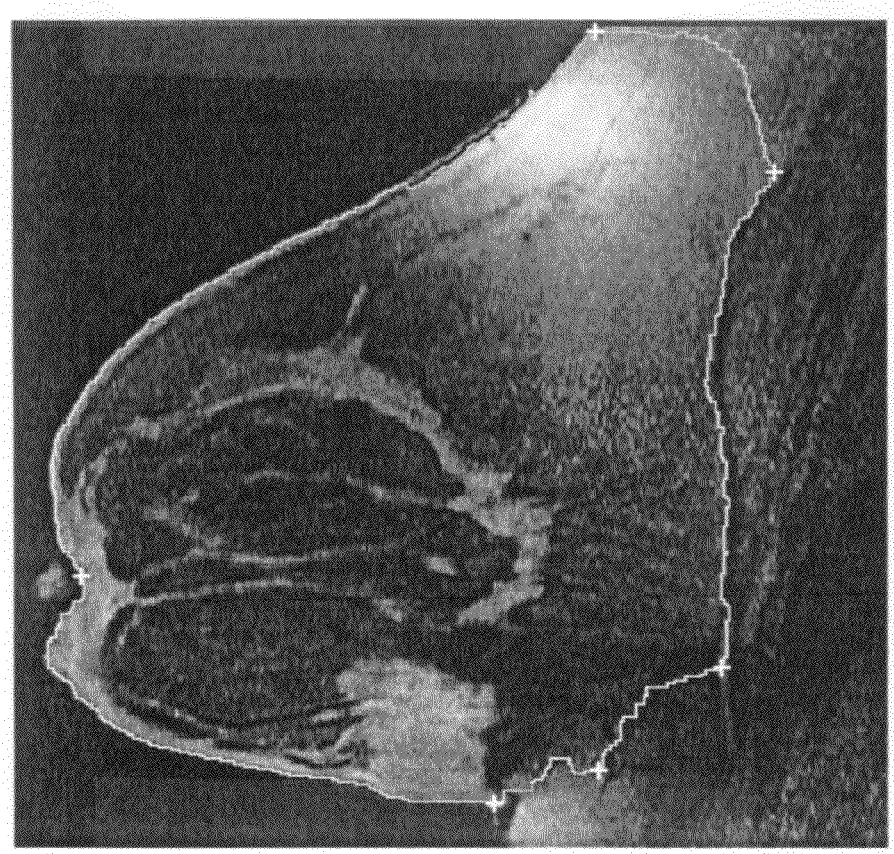
FIG. 4 is a segmentation of an MRI image slice.

In practice, live wire (LW) is used interactively with a user via the interface 108 and allows a user to place anchor points (APs) on an object of interest on a slice. The user then begins to trace the outline of the item of interest on the slice from a seed anchor point towards a second anchor point and a segment is formed. A live wire segment, which constitutes a minimum cost path, from any initial anchor point (AP) selected on the boundary to any subsequent cursor position is found and displayed in real time as the cursor is moved. If the cursor is close to the desired boundary, the live wire segment snaps on to the boundary, even in the presence of other object boundaries that come close to the desired boundary which otherwise have similar properties but opposite orientation. The entire boundary is thus segmented as a sequence of oriented, optimal live wire segments. FIG. 4 shows the live wire segmentation of a magnetic resonance image of a breast image slice after training and optimum feature selection as described in the paper by A. X. Falcao, J. K. Udupa, S. Samarasekera, B. E. Hirsch, and S. Sharma cited above. In FIG. 4, a live wire segmentation of a MRI breast slice is accomplished using only six anchor points (shown as white crosses). The six anchor points were sufficient to segment the whole breast. Note that clockwise oriented live wire segments (shown as the light gray contour) found as globally optimal paths between each pair of anchor points are shown.

The snakes computer program uses computer-generated curves that move within images to find object boundaries. Snakes are often used in medical image analysis to detect and locate objects, and to describe their shape. Rough shape and starting position of the snake are specified by the user. This is done by clicking a few points on the image which become the vertices of the initial snake. The snake is defined as an energy minimizing contour where the energy function is a combination of internal and external forces. An iterative procedure causes the snake to shrink, reduce its total curvature and move towards interesting objects in image.

Snakes are deformable models widely used in image segmentation since first introduced by M. Kass, A. Witkin, and D. Terzopoulos, in a paper entitled "Snakes: Active Contour Models", International Journal of Computer Vision, vol 1, pp. 321-331, 1987. A snake is an energy functional minimization strategy in which users can interact with the contour model by pushing it toward a desired local minimum. A parametric curve X(s), s $\in$ [0,1], which minimizes the energy functional must satisfy the following Euler-Lagrange equation.

$$\frac{\partial}{\partial s}\left(\alpha \frac{\partial X}{\partial s}\right) - \frac{\partial^2}{\partial s^2}\left(\beta \frac{\partial^2 X}{\partial s^2}\right) - \nabla P(X) = 0 \qquad \text{(Equation 1)}$$

where α, β are constants that control the strength of the model's tension and rigidity, respectively. P is the potential energy defined over the image domain and usually employed to attract the snake toward the object boundary.

The methods of live wire and snake as expressed above are extended as a part of the current invention. The extension of the live wire methodology to a three-dimensional (3D) object segmentation strategy is accomplished in the current invention in such a way that the method will require minimum user help during the entire process. The basic assumption is that the object boundary does not change abruptly between successive slices. In such cases, the anchor points projected from the current slice to the next slice would usually lie in the vicinity of the boundary. The inventive iterative live wire finds optimal live wire segments between each pair of successive anchor points. Mid points from these segments are then used as new anchor points and the live wire method is repeated. It is expected that after a few iterations, or until negligible or no changes are observed in two successive iterations, these new anchor points should be all located on the desired object boundary and the live wire segments found between them would match the true boundary well.

Figure 5:
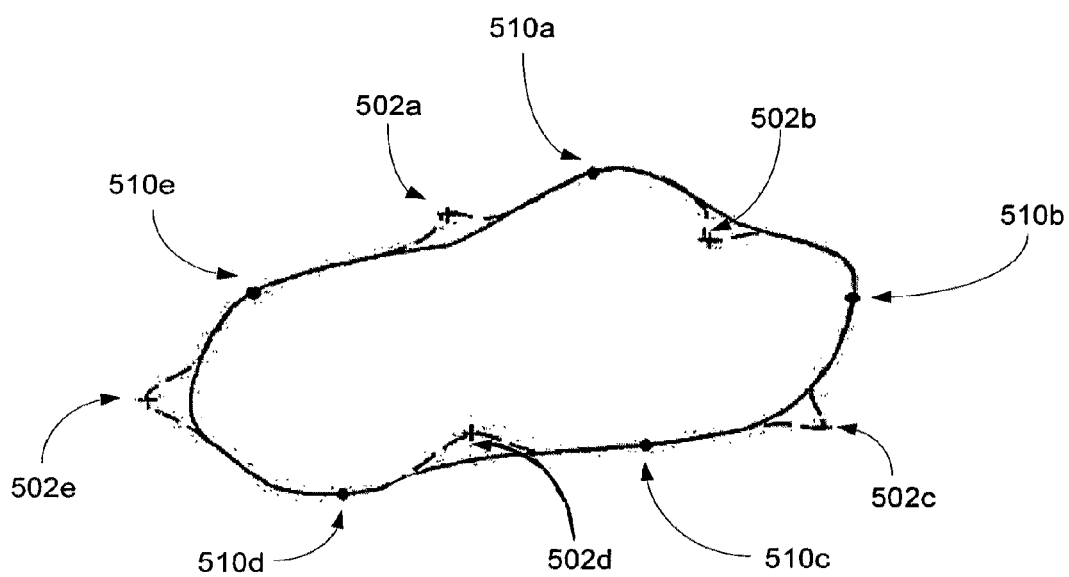
FIG. 5 is a depiction of the iterative live wire process.

FIG. 5 depicts the results of the iterative live wire process on an adjacent image slice. First, anchor points are placed on a first slice to define the boundaries of an item of interest in the slice. An adjacent slice is then addressed. The new iterative live wire process projects the anchor points from the previous (or next) slice to the current adjacent slice. In FIG. 5, these anchor points are shown by a cross as items 502 a-e. The live wire segments found between these points are shown as dotted lines. The mid points between the anchor points are shown as small filled circles as items 510 *a-e*. The true boundary is shown by a solid line in FIG. 5. If segmentation in a slice is unacceptable, the user intervenes and initiates a manual live wire segmentation adjustment. During a manual segmentation adjustment, the user refines the location of the contours of the segmentation to place the contour on a boundary of the item of interest. The process continues until all slices are covered.

In one embodiment, a software tool entitled 3DVIEWNIX is used. This software was developed by the Medical Imaging Processing Group of the University of Pennsylvania, Department of Radiology in Philadelphia, Pa. Using the 3DVIEWNIX software, the user initially selects a slice $s_0$ and places anchor points on an item of interest on the slice as described above. The software exercises the live wire method to produce segmentation for the currently viewed slice. When the user selects the next slice (via a command NEXT), the anchor points are projected on to the next slice, the iterative live wire method then continues as described above where mid points are selected, anchor points are changed, and a segmentation is accomplished on the present (next) slice. The process of projecting, and determining midpoints may be iterated by the image processing equipment until segmentation converges and the result is displayed on a computer monitor. If the result is acceptable, the user selects NEXT again to access the next further adjacent slice to segment that slice and so on. By selecting previous slices (via PREV command), from slice $s_0$, the process is repeated in the backward direction from $s_0$. If at any point the result is not acceptable, the user simply places new anchors on the object of interest, and interactive live wire segments the slice. The process continues in this manner until all slices are segmented.

It is a feature of the current invention that the new iterative live wire process can also include the use of live wire as well as snake. For example, in the iterative live wire scenario, described above, after an initial live wire segmentation on the first selected image slice, the process can be continued or concluded with the use of live wire algorithm-based segmentation or with the snake algorithm-based segmentation.

In another aspect of the invention, the basic approach used in the new iterative live wire method may be used with the snake program. When the snake computer program is used along with the techniques of the new iterative live wire method to provide segmentation of medical image slices, it is called live snake (LS). In the new live snake method, the snake segmentation is used after a user places anchor points on an item of interest on a medical image slice. The snake method then segments the item of interest using the snake segmentation algorithm. As the next slice is selected to segment, elements of the new live snake method are employed.

As described before, the anchor points and segments are projected to the next selected, adjacent medical image slice. The projection may be an orthographic projection of the anchor points. The midpoints of the segments are calculated along the boundaries of an item of interest of the image slice. The mid points become the new anchor points and the live snake is invoked to calculate new segments for the adjacent image. The next slice is then selected by the user and the process continues until all desired image slices are segmented. It is a feature of the current invention that a live snake process can also include the use of live wire as well as snake. For example, in the live snake scenario described above, after an initial snake segmentation on the first selected image slice, the process can be continued or concluded with the use of live wire instead of the snake algorithm.

In one embodiment, the software tool 3DVIEWNIX is used to implement the new live snake method of segmentation of medical image slices. Using the 3DVIEWNIX software, the user initially selects a slice $s_0$ and places anchor points on an item of interest on the slice as described above. The software exercises the snake algorithm method to produce segmentation for the currently viewed slice. When the user selects the next slice (via a command NEXT), the anchor points are projected on to the next slice, the method then continues where mid points are selected, anchor points are changed to the mid points, and a segmentation is accomplished on the present (next) slice. The segmentation of adjacent slices may be performed either by the snake algorithm or the live wire algorithm. As before, the process of projecting, and determining midpoints may be iterated until segmentation converges and the result is displayed on a computer monitor. If the result is acceptable, the user selects NEXT again to access the next further adjacent slice to segment that slice and so on. By selecting previous slices (via PREV command), from slice $s_0$, the process is repeated in the backward direction from $s_0$. If at any point the result is not acceptable, the user simply places new anchors on the object of interest, and the new live snake process segments the slice. The process continues in this manner until all slices are segmented.

Figure 6:
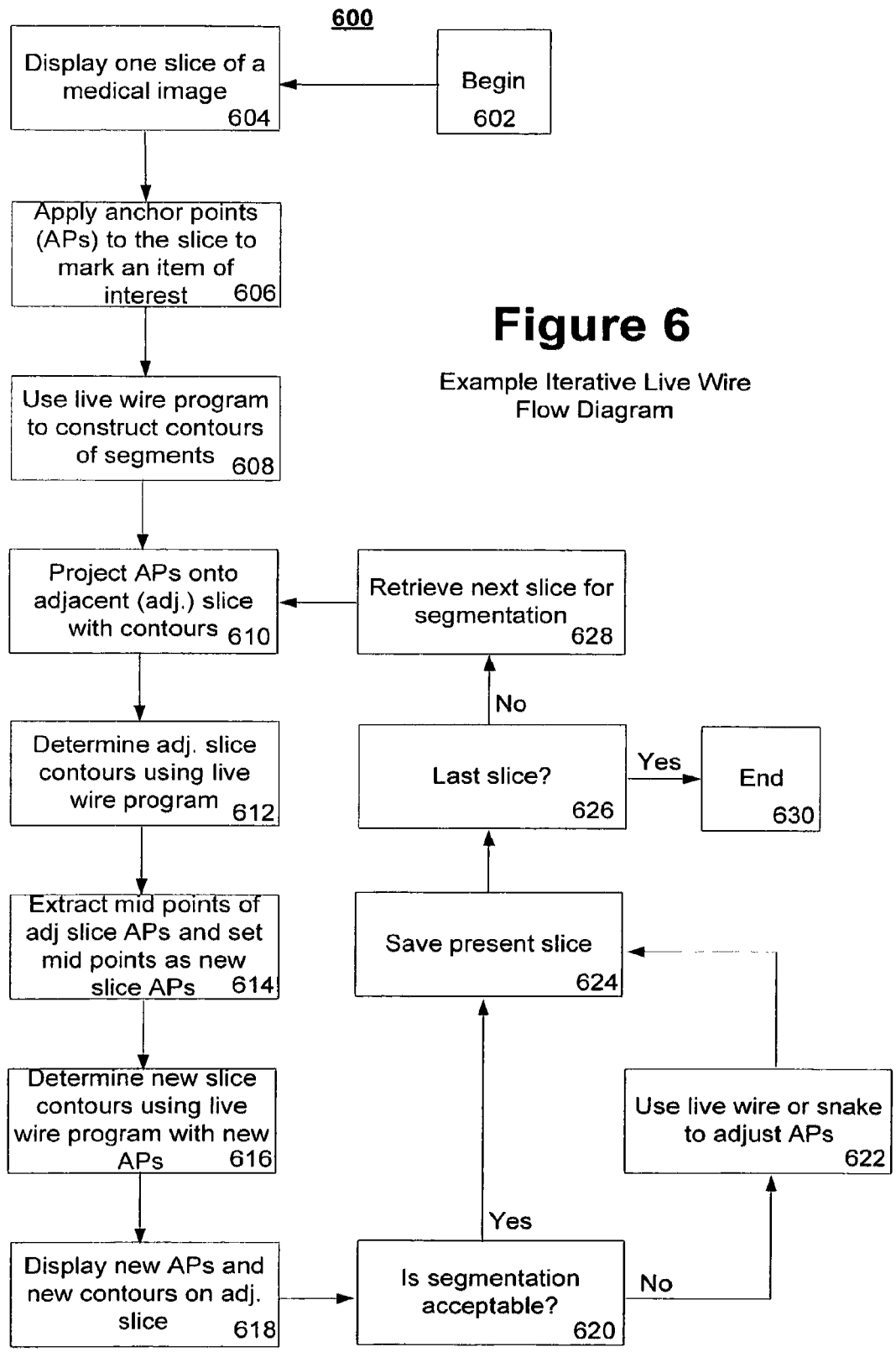
FIG. 6 is a flow diagram of an example iterative live wire method.

FIG. 6 depicts an example flow diagram for the new method 600 of iterative live wire. The method begins at step 602. Initially, an object is imaged such that a set of digital images is produced. Each digital image is an imaged slice of the object. The set of digital images is a set of image slices representing the object. In one embodiment, the object is a medical object, and the slices are individual images taken using magnetic resonance imaging or computer tomography methods. One slice of the medical image is displayed at step 604. The displayed slice is examined by a computer user and the user applies anchor points (APs) to the slice to assist in the identification of an item of interest at step 606. An item of interest can be any item which is discernable in the slice image. Such an item may be the outline of the medical object or an internal structure of the object of the medical image. Identification of an item of interest is one step in the process of segmentation. Image segmentation is typically used to locate objects and boundaries in images such as lines, curves, and the like.

The live wire computer program is used in step 608 to construct contours of segments of the item of interest in the displayed slice. In use, the computer user sets a starting or seed anchor point by clicking with a computer pointer on a portion or feature of the item of interest on the displayed image slice. Generating a first anchor point picks up a first pixel vertex on the image slice. Then, the user starts to move the pointing device, such as a computer mouse, over the feature in the image. The live wire software program finds the smallest cost path that is drawn from the starting anchor point (a first pixel vertex) to the image pixel vertex where the pointing device is currently located. The smallest cost path forms on and along the feature that was initially marked by the user with the first anchor point. If the user wants to choose the path that is being displayed, he simply clicks the image again and that way also sets a next anchor point. The live wire program snaps on the border of the feature of the item of interest. Thus a contour is generated from a first anchor point to a next anchor point along the border of the image of interest. In continuing to establish new anchor points along the border of the item of interest, the user, with the help of the live wire program, segments the entire item of interest on the image slice. As a result, visible contours on the border of the item of interest are produced on the slice image.

The anchor points established on the displayed slice are projected onto the next image slice in step 610. The projection may be an orthographic projection of the anchor points. The next image slice is an adjacent image slice in the set of slices. The adjacent slice may be a slice occurring either before or after the earlier displayed and segmented slice. Either adjacent slice is acceptable as the next slice. The method 600 then automatically segments the adjacent slice by determining the adjacent, now displayed, slice using the contour following capability of the live wire program in step 612. Once the contours of the adjacent slice are determined, the method 600 extracts the locations of the midpoints between the anchor points, along the border of the item of interest, and sets the midpoints as new anchor points in step 614. The new anchor points lie on the item of interest on the displayed adjacent slice but are different from the anchor points of the previously segmented slice. Now, using the new anchor points, the live wire program determines the adjacent slice contours in step 616. Thus, the adjacent slice is segmented by using a set of anchor points that were automatically determined. The new anchor points and the newly determined contours are displayed as superimposed on the displayed adjacent slice per step 618.

At this point, the user is able to assess if the automatic segmentation of the adjacent slice is acceptable per step 620. If it is not acceptable, then the user is able to manually adjust the segmentation using the live wire program per step 622. During a manual segmentation adjustment, the user refines the location of the contours of the segmentation to place the contour on a boundary of the item of interest. As an alternative, the user can also adjust the segmentation of the adjacent slice by using the well known snake program. In either case, if manual adjustments are made, the changes made to the slice are saved in step 624. It should be noted that there are many points in the method 600 where interim results may be saved without departing from the spirit of the invention. Step 624 is used to highlight that, at a minimum, finished results of a processed slice are saved. If the automatic segmentation of the adjacent slice is acceptable at step 620, the results of the segmentation of the displayed slice are saved per step 624.

At step 626, the process 600 queries whether the last slice in the set of slices has been processed. If the last slice has been processed, the method 600 ends at step 630. If the last slice in the set of slices has not been processed, then the next adjacent slice is selected for segmentation at step 628. Here, the method 600 continues by taking the final anchor points of the previous slice and projecting them onto the next adjacent slice as part of step 610. The method continues through steps 612 through step 626 until all slices of the set of slices have been segmented. In general, the result of image segmentation is a set of regions that collectively cover the entire image in the set of image slices, or a set of contours highlighting an item of interest extracted from the image set.

Figure 7:
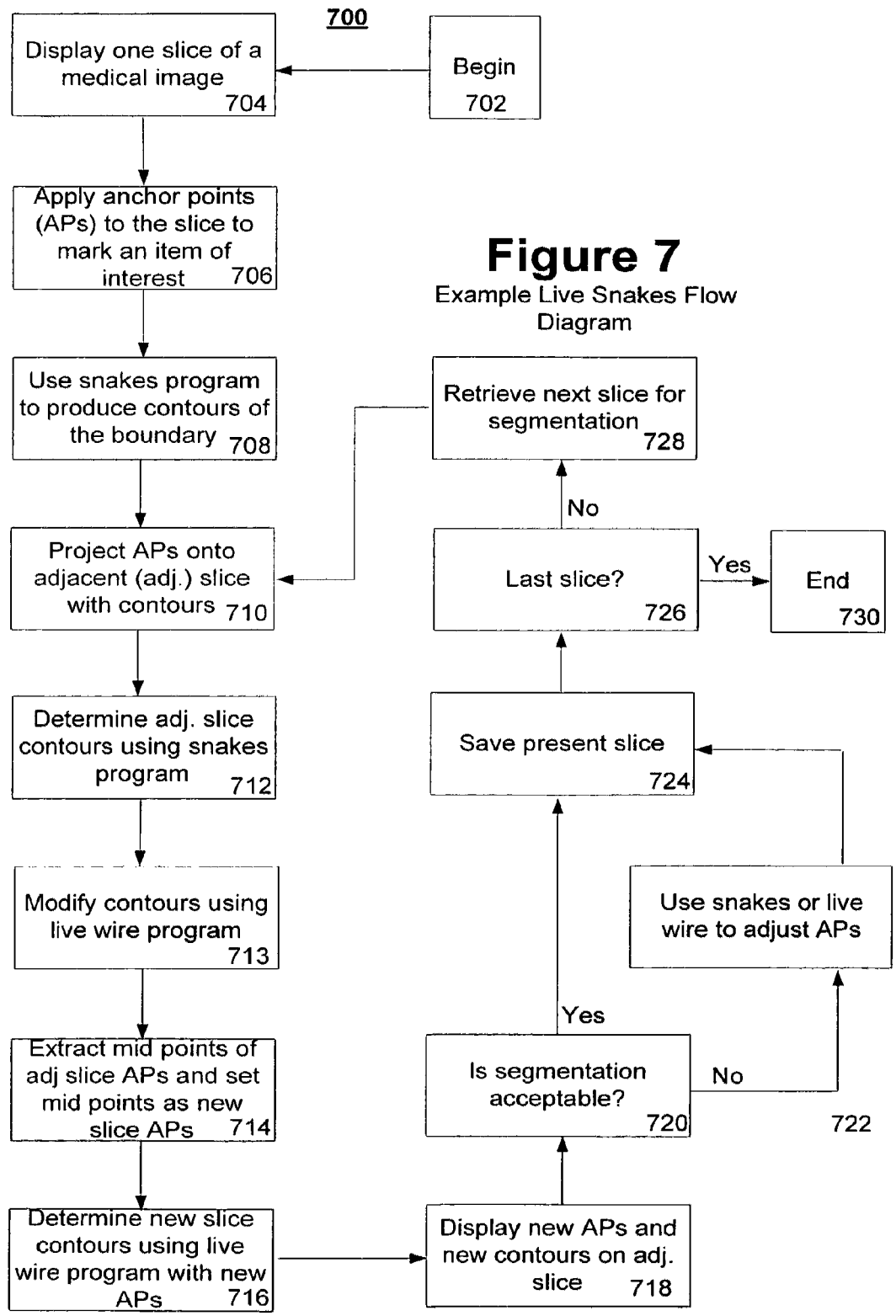
FIG. 7 is a flow diagram of an example live snakes method.

FIG. 7 depicts an example flow diagram for the new method of live snake. In general, the method 700 uses similar principles as that of method 600 modified to use the new live snakes method. The method begins at step 702. Initially, an object is imaged such that a set of digital images is produced. Each digital image is an imaged slice of the object. A first slice of the medical image is displayed at step 704. The displayed slice is examined by a computer user and the user applies anchor points (APs) to the slice to assist in the identification of an item of interest at step 706.

In the method 700, the well-known snakes computer program is used in step 708 to construct contours of segments of the item of item of interest in the displayed slice. In use, the computer user uses a pointing mechanism, such as a cursor moved via a computer mouse, to rough-out the shape and starting position of a snake computer construct as in step 706. Normally, a few anchor points are positioned by the user to establish the vertices of the initial snake construct. The construct uses an energy minimizing algorithm to shrink or expand the snake to the boundaries of the object of interest on the displayed slice. The snakes program thus produces the contours of the boundary of the item of interest on the displayed slice.

The anchor points established on the displayed slice are projected onto the next image slice in step 710. The next image slice is an adjacent image slice in the set of slices. The adjacent slice may be a slice occurring either before or after the earlier displayed and segmented slice. Either adjacent slice is acceptable as the next slice. The projection of the anchor points to the next slice may be an orthographic projection and is proximate to a boundary of an item of interest on the slice. The method 700 then automatically segments the adjacent slice by determining the now displayed adjacent slice using the contour following capability of the snakes program in step 712. The method 700 then modifies these contours at step 713 by applying the live wire program to the projected APs. Once the modified contours of the adjacent slice are determined, the method 700 extracts the locations of the midpoints between the anchor points, along the border of the item of interest, and sets the midpoints as new anchor points in step 714. The new anchor points lie on the item of interest on the displayed adjacent slice but are different from the anchor points of the previously segmented slice. Now, using the new anchor points, the live wire program determines the adjacent slice contours in step 716. Thus, the adjacent slice is segmented by using a set of anchor points that were automatically determined. The new anchor points and the newly determined contours are displayed as superimposed on the displayed adjacent slice per step 718. In practice, the live wire and snakes program combination may iterate a few times or until negligible or no changes are observed in two successive iterations to ensure that the new anchor points are all located on the desired object boundary and the contours of the boundaries of the item of interest are well established.

At this point, the user is able to assess if the automatic segmentation of the adjacent slice is acceptable per step 720. If it is not acceptable, then the user is able to manually adjust the segmentation using the snakes program per step 722. During a manual segmentation adjustment, the user refines the location of the contours of the segmentation to place the contour on a boundary of the item of interest. As an alternative, the user can also adjust the segmentation of the adjacent slice by using the live wire program. In either case, if manual adjustments are made, the changes made to the slice are saved in step 724. It should be noted that there are many points in the method 700 where interim results may be saved without departing from the spirit of the invention. Step 724 is used to highlight that, at a minimum, finished results of a processed slice are saved. If the automatic segmentation of the adjacent slice is acceptable at step 720, the results of the segmentation of the displayed slice are saved per step 724.

At step 726, the process 700 queries whether the last slice in the set of slices has been processed. If the last slice has been processed, the method 700 ends at step 730. If the last slice in the set of slices has not been processed, then the next adjacent slice is selected for segmentation at step 728. Here, the method 700 continues by taking the final anchor points of the previous slice and projecting them onto the next adjacent slice as part of step 710. The method continues through steps 712 through step 726 until all slices of the set of slices have been segmented. In general, the result of image segmentation is a set of regions that collectively cover the entire image in the set of image slices, or a set of contours highlighting an item of interest extracted from the image set.

Application of the present invention results in synergistic performance results. A quantitative experimental evaluation (efficiency, precision and accuracy) was performed by comparing the four methods x ∈ {LW, snakes, ILW, LS). Efficiency refers to the practical viability of the method such as overall time, user help, and number of anchor points used. Precision refers to the repeatability of the method considering the subjective action taken by the user during the segmentation process. Accuracy refers to the degree of agreement with ground truth. In the snake method, parameters used are α=0.01 and, β=0.015 in Equation 1 and five iterations. The same cost assignments for LW, ILW, LS, and all parameters were kept fixed during the whole evaluation. All methods were implemented in an internal version of the 3DVIEWNIX software and were executed on a PC having a Pentium IV, 3.2 GHz processor with 1 GB RAM.

A set of 30 breast MRI scenes was used in these experiments in which the whole breast region is the object of interest. The size of the scene domain is 256×256×26 with a voxel size of 0.7×0.7×3.0 mm$^3$. Each of two operators $O_1$, and $O_2$, segmented ($O_1$ segmented in two separate trials) the whole breast region in these scenes by using each of the four methods. The speed of segmentation $SP_e$ of any segmentation experiment e (expressed in number of slices/min) is defined as the total number of slices in a scene divided by the time in minutes that is taken to complete the segmentation of the scene. Table 1 shows the average value of $SP_e$ over the 30 scenes, the percentage of user help (defined as the fraction of slices in the scene that needed manual initialization), and the number of anchor points (APs) required over all segmentation experiments of both operators. The precision of segmentation $PR_x$, calculated by using method x is the average value over all segmentation experiments e of both operators (intra- and inter-operator precision are shown in Table 2), are defined as $$PR_x = \left[\frac{C_{xe1} \cap C_{xe2}}{C_{xe1} \cup C_{xe2}}\right] \times 100 \qquad \text{(Equation 2)}$$

where Cxe, is the binary scene of C resulting from method x in a segmentation experiment e. |Cxe1∩Cxe2| denotes the number of 1-valued voxels within the intersection region defined by two segmentation experiments e1 and e2 involving the same scene C. |Cxe1∪Cxe2| indicates the total number of 1-valued voxels in the union region defined by e1 and e2 for the same scene C. PRx, measures intra-operator precision when $O_1=O_2$, and it measures inter-operator precision when $O_1$ is not equal to $O_2$. Table 3 shows the accuracy values False Negative Volume Fraction (FNVF) and False Positive Volume Fraction (FPVF), which are as described in the paper by J. K. Udupa, V. R. LeBlanc, Y. Zhuge. C. Imielinska, H. Schmidt, L. Currie, B. E. Hirsch, J. Woodburn, entitled A framework for evaluating image segmentation algorithms, Computerized Medical Imaging and Graphics, vol. 30, pp. 75-87, 2006, for snakes, ILW, and LS methods by using LW segmentation results as ground truth.

TABLE 1

Average of segmentation speeds, the percentage of user help, and the number of APs for each method.

|  | Slices/min | User Help % | # of APs |
|---|---|---|---|
| LW | 3.6 | 100.0 | 7 |
| Snakes | 2.6 | 32.0 | 20 |
| ILW | 13.2 | 14.0 | 7 |
| LS | 11.6 | 10.0 | 6 |

TABLE 2

Mean intra- and inter-operator segmentation precision PRx (%) for each method.

|  | Intra-Operator Precision | Inter-Operator Precision |
|---|---|---|
| LW | 97.0 | 95.0 |
| Snakes | 93.0 | 88.0 |
| ILW | 97.0 | 95.0 |
| LS | 96.0 | 93.0 |

TABLE 3

Segmentation accuracy average values of false negative volume fraction (FNVF) and false positive volume fraction (FPVF) for each method.

|  | FNVF (%) | FPVF (%) |
|---|---|---|
| Snakes | 3.79 | 5.00 |
| ILW | 0.45 | 1.21 |
| LS | 0.93 | 1.67 |

The above results indicate that the above described new methods of iterative live wire (ILW) and live snakes (LS) for interactive 3D image segmentation combine the complementary strengths of live wire and snakes to arrive at more efficient and accurate strategies than the individual methods. Hence a before-unknown synergy is generated. Model-based strategies, such as snakes, are stronger, when successful, in the recognition task of determining roughly where the object is than an image-based or global optimal strategy such as live wire. On the other hand, live wire is better in more accurate delineation to determining the object region occupied compared to snakes. The new methods of iterative live wire (ILW) and live snakes (LS) combine these previously uncombined strengths to result in methods that can be readily used in any segmentation application. In the new iterative live wire method, the model information is provided by the user implicitly. In the new live snakes method, this information comes explicitly via the snake model, but subsequently modified in a synergistic manner by live wire. The results indicate that, on average, segmentation speed (i.e. number of slices/min) is higher in the new methods than in the previous live wire or snakes methods. Iterative live wire (ILW) and live snakes (LS) also require far less anchor point placements and user intervention during segmentation than the previous snakes and live wire methods. Substantial (i.e. 3-5 fold) and statistically significant (p<0.01) improvement in speed is reached by the new methods over the previous live wire and snakes methods. Precision is better for the live methods (LW, ILW and LS) than for snakes as these methods become more tightly coupled with the user-controlled process. Overall, intra-operator precision was slightly better than inter-operator precision (i.e. about 2%-3%) for live methods, and about 5% for snakes. The new iterative live wire (ILW) segmentations were slightly more accurate (p<0.01) than the new LS segmentations considering both FNVF and FPVF, and both methods were substantially more accurate than the prior snakes method. Overall, taking speed, precision, and accuracy of segmentation into account, iterative live wire (ILW) emerges as the new method of choice among the tested methods.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention.

While aspects of the present invention has been described in connection with the preferred embodiments of the various figures, it is to be understood that other similar embodiments may be used or modifications and additions may be made to the described embodiment for performing the same function of the present invention without deviating there from. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method for the interactive segmentation of medical image slice data using a computer, the method comprising:
   (a) displaying an image slice p of a set of two dimensional medical image slice data on a display of the computer;
   (b) applying a set of anchor points on the displayed slice p, the slice p anchor points manually placed by a computer user on a boundary of an item of interest of the displayed slice p;
   (c) interactively constructing slice p contours, using the slice p anchor points, to form an outline of the boundary of the item of interest on the displayed slice p;
   (d) projecting the slice p anchor points and the slice p contours to an adjacent image slice q, the projection onto slice q being proximal to a boundary of an item of interest on slice q;
   (e) determining slice q contours using the projection onto the slice q and the boundary of an item of interest on the slice q;
   (f) extracting midpoints on the slice q contours between slice q anchor points formed by projecting slice p anchor points in said projecting step;
   (g) setting the midpoints as the new slice q anchor points;
   (h) determining new slice q contours using the new slice q anchor points;
   (i) displaying the new slice q contours and the new slice q anchor points superimposed on the image slice q.

2. The method of claim 1, further comprising repeating steps (f), (g), (h), and (i) until negligible changes are observed in successive iterations.

3. The method of claim 1, wherein step (d) comprises an orthographic projection of the anchor points from the slice p to the slice q which is adjacent to slice p.

4. The method of claim 1, further comprising:
   (j) manually refining, by the computer user, a final position of the new slice q contour onto the boundary of an item of interest of slice q.

5. The method of claim 4, wherein manually refining comprises interactively using a live wire computer program.

6. The method of claim 4, wherein manually refining comprises interactively using a snakes computer program technique.

7. The method of claim 1, further comprising:
   (j) repeating the actions of steps (d) through (i) by first projecting the new slice q contours and the new slice q anchor points onto a slice r which is adjacent to slice q.

8. A method for the interactive segmentation of medical image slice data using a computer, the method comprising:
   (a) displaying an image slice p of a set of two dimensional medical image slice data on a display of the computer;
   (b) applying a set of anchor points on the displayed slice p, the slice p anchor points manually placed by a computer user on a boundary of an item of interest of the displayed slice p;
   (c) interactively constructing slice p contours, using the slice p anchor points and a snakes computer program, to form an outline of the boundary of the item of interest on the displayed slice p;
   (d) projecting the slice p anchor points and the slice p contours to an adjacent image slice q, the projection onto the slice q being proximal to a boundary of an item of interest of the slice q;
   (e) determining slice q contours using the projection onto the slice q and the boundary of an item of interest on the slice q, the slice q contours determined using the snakes computer program;
   (f) modifying the slice q contours;
   (g) setting midpoints on the modified slice q contours as new slice q anchor points;
   (h) determining new slice q contours using the new slice q anchor points, the new slice q contours determined using the snakes computer program;
   (i) displaying the new slice q contours and the new slice q anchor points superimposed on the image slice q.

9. The method of claim 8, further comprising repeating steps (f), (g), (h), and (i) until negligible changes are observed in successive iterations.

10. The method of claim 8, wherein step (d) comprises an orthographic projection of the anchor points from the slice p to the slice q which is adjacent to slice p.

11. The method of claim 8, further comprising:
    (j) manually refining, by the computer user, a final position of the new slice q contour onto the boundary of an item of interest of slice q.

12. The method of claim 11, wherein manually refining comprises interactively using a live wire computer program.

13. The method of claim 11, wherein manually refining comprises interactively using a snakes computer program technique.

14. The method of claim 8, further comprising:
    (k) repeating the actions of steps (d) through (i) by first projecting the new slice q contours and the new slice q anchor points onto a slice r which is adjacent to slice q.

* * * * *